United States Patent [19]

Young

[11] Patent Number: 4,967,785
[45] Date of Patent: Nov. 6, 1990

[54] VALVE ACTUATOR

[75] Inventor: Terry G. Young, Spring, Tex.

[73] Assignee: Baker Hughes Incorporated, Houston, Tex.

[21] Appl. No.: 515,600

[22] Filed: Apr. 27, 1990

[51] Int. Cl.$^5$ .................... F16K 43/00; F16K 31/122
[52] U.S. Cl. ............................... 137/315; 92/128;
 92/130 B; 92/130 C; 251/63.6; 277/112;
 277/124; 384/297; 403/309
[58] Field of Search ............... 92/128, 130 B, 130 C,
 92/130 R, 165 R; 137/315; 251/63.4, 63.5, 63.6;
 277/102, 110, 112, 123, 124, 125; 384/297, 300;
 403/300, 309, 310

[56] References Cited

U.S. PATENT DOCUMENTS

| | | | |
|---|---|---|---|
| 2,733,041 | 1/1956 | Crookston | 92/130 R |
| 3,168,320 | 2/1965 | Sneed | 277/124 |
| 3,379,405 | 4/1968 | Natho | 251/63.6 |
| 3,528,668 | 9/1970 | Barton | 277/124 |
| 4,129,283 | 12/1978 | Taylor | 251/62 |
| 4,158,511 | 6/1979 | Herbenar | 384/297 |
| 4,423,748 | 1/1984 | Ellett | 92/130 C |
| 4,445,424 | 5/1984 | Foster et al. | 251/63.6 |
| 4,523,515 | 6/1985 | Smith | 92/128 |
| 4,744,386 | 5/1988 | Frazer | 137/315 |

Primary Examiner—Geroge L. Walton
Attorney, Agent, or Firm—Steve Rosenblatt

[57] ABSTRACT

A valve actuator is disclosed which is encased in a housing with a bonnet mounted at one end and an end cap on the other end. Inside, an actuator shaft is slidably mounted through a bore on a guide connected to the bonnet. A piston is slidably mounted with respect to the guide and creates a variable-volume cavity between itself and the guide. The shaft is connected to the piston by virtue of a disk which, when bolted down to the top of the shaft, puts a preload in the spring. A connecting member is placed into contact with the disk and the piston once the spring has been preloaded. The connecting member is segmented and fits between spacers which hold the spring at a distance from the disk and allow insertion of the connecting member after preloading of the spring. The spring bears on the connecting member. Pressurization of the cavity results in an overcoming of the spring force and movement of the shaft between a first and second position. The guide has a liner which is replaceable to effectively change the bore size in the guide, allowing the actuator to accommodate different shafts having a variety of diameters, depending upon the application.

28 Claims, 2 Drawing Sheets

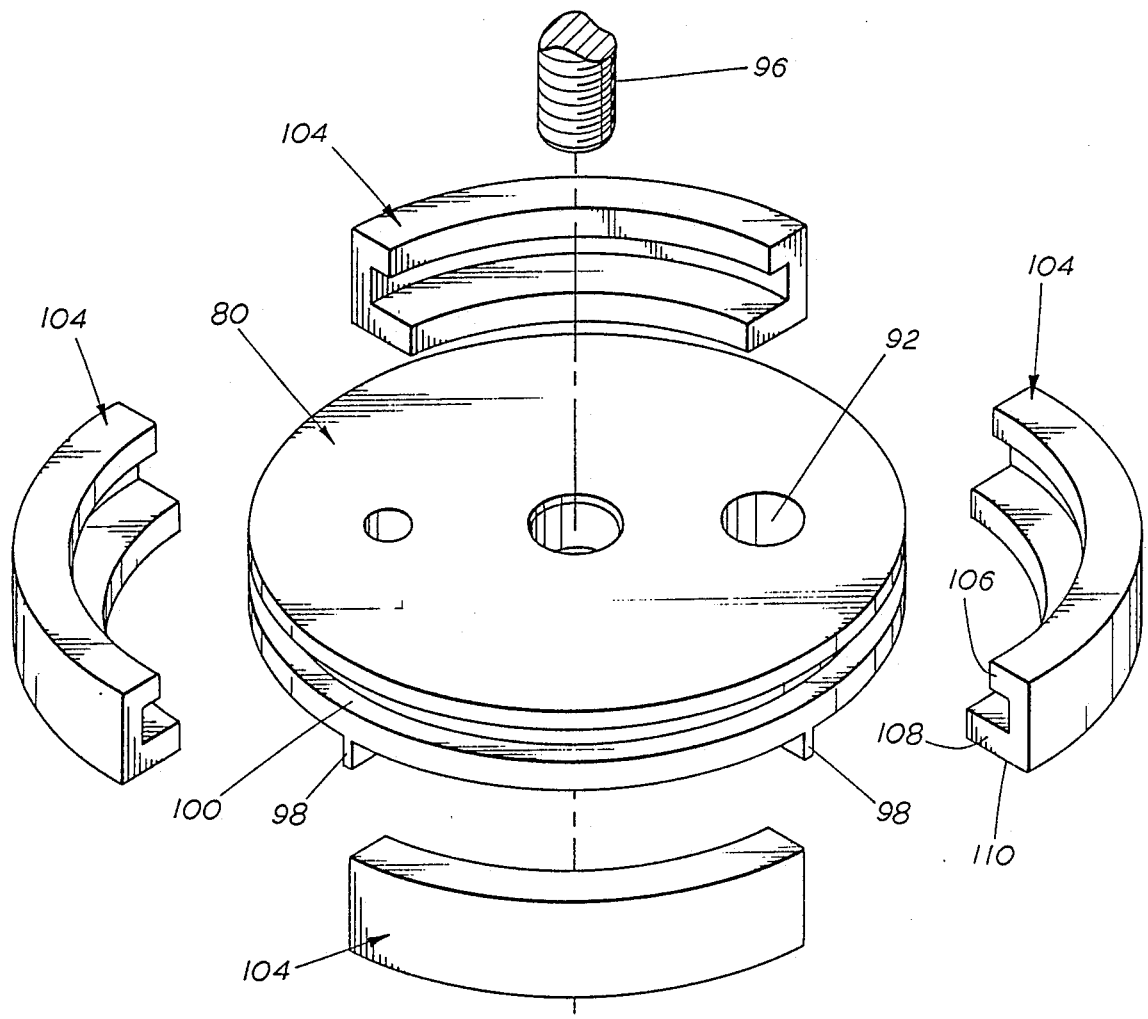
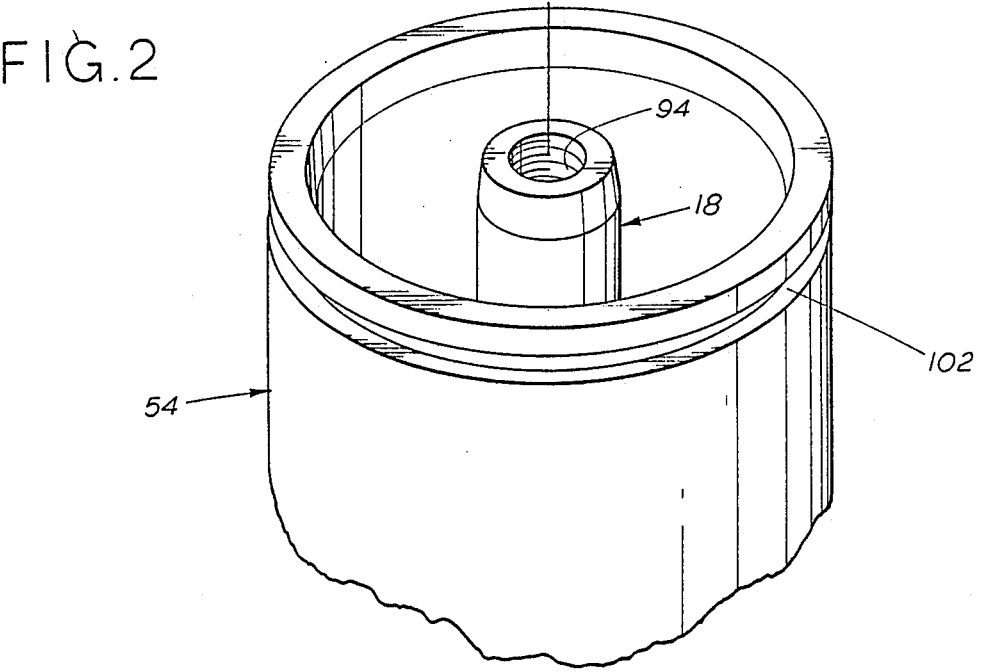
FIG. 2

VALVE ACTUATOR

FIELD OF THE INVENTION

The field of this invention relates to hydraulic valve actuators.

BACKGROUND OF THE INVENTION

In the past, various designs of valve actuators have been employed to operate valves in a variety of uses. Typically, actuators encompass a housing and a shaft slidably mounted in the housing and connected to a piston. The housing has an inlet to admit hydraulic pressure on one side of the piston. On the other side of the piston, a spring is disposed which bears on the piston. The spring provides the necessary force to draw the shaft back into the actuator, thereby closing the valve (or opening the valve, depending on the design) when hydraulic pressure is relieved or lost on top of the piston. It has been desirable in past designs to ensure that there is preload in the spring when the hydraulic pressure on the piston is withdrawn such that the spring is still somewhat compressed from its relaxed state at the conclusion of the stroke. In prior designs, housings have to be built at least as tall as the spring in a relaxed state. Specially designed presses were then employed to compress the spring and add any necessary retaining springs or other members that would keep the spring from jumping out of the housing if the top cover plate were removed.

Prior designs of actuators involve a specific design of an actuator for a specific application. Accordingly, the shaft was sized depending upon the encountered loads affecting the gate in the valve which is to be connected to the actuator shaft. This type of design limited the usefulness of actuators insofar as it was desired to use a given actuator for a valve other than that for which it was initially specified. While the components in the actuator may be suitable for a variety of applications, the actuator shaft diameter requirements may change, depending on the application. The apparatus of the present invention provides adaptability to handle a variety of shaft diameters in an existing actuator body.

The apparatus of the present invention also allows for assembly and preloading of the spring without any special tools and without the housing attached to the bonnet.

Of interest in understanding the background of the invention is the hydraulic actuator model SWC made by Baker CAC.

SUMMARY OF THE INVENTION

A valve actuator is disclosed which is encased in a housing with a bonnet mounted at one end and an end cap on the other end. Inside, an actuator shaft is slidably mounted through a bore on a guide connected to the bonnet. A piston is slidably mounted with respect to the guide and creates a variable-volume cavity between itself and the guide. The shaft is connected to the piston by virtue of a disk which, when bolted down to the top of the shaft, puts a preload in the spring. A connecting member is placed into contact with the disk and the piston once the spring has been preloaded. The connecting member is segmented and fits between spacers which hold the spring at a distance from the disk and allow insertion of the connecting member after preloading of the spring. The spring bears on the connecting member. Pressurization of the cavity results in an overcoming of the spring force and movement of the shaft between a first and second position. The guide has a liner which is replaceable to effectively change the bore size in the guide, allowing the actuator to accommodate different shafts having a variety of diameters, depending upon the application.

BRIEF DESCRIPTION OF THE DRAWINGS

FIG. 2 is an exploded view of the disk, piston, and connecting member, showing the spacers on the underside of the disk.

DETAILED DESCRIPTION OF THE PREFERRED EMBODIMENT

Figure 1:
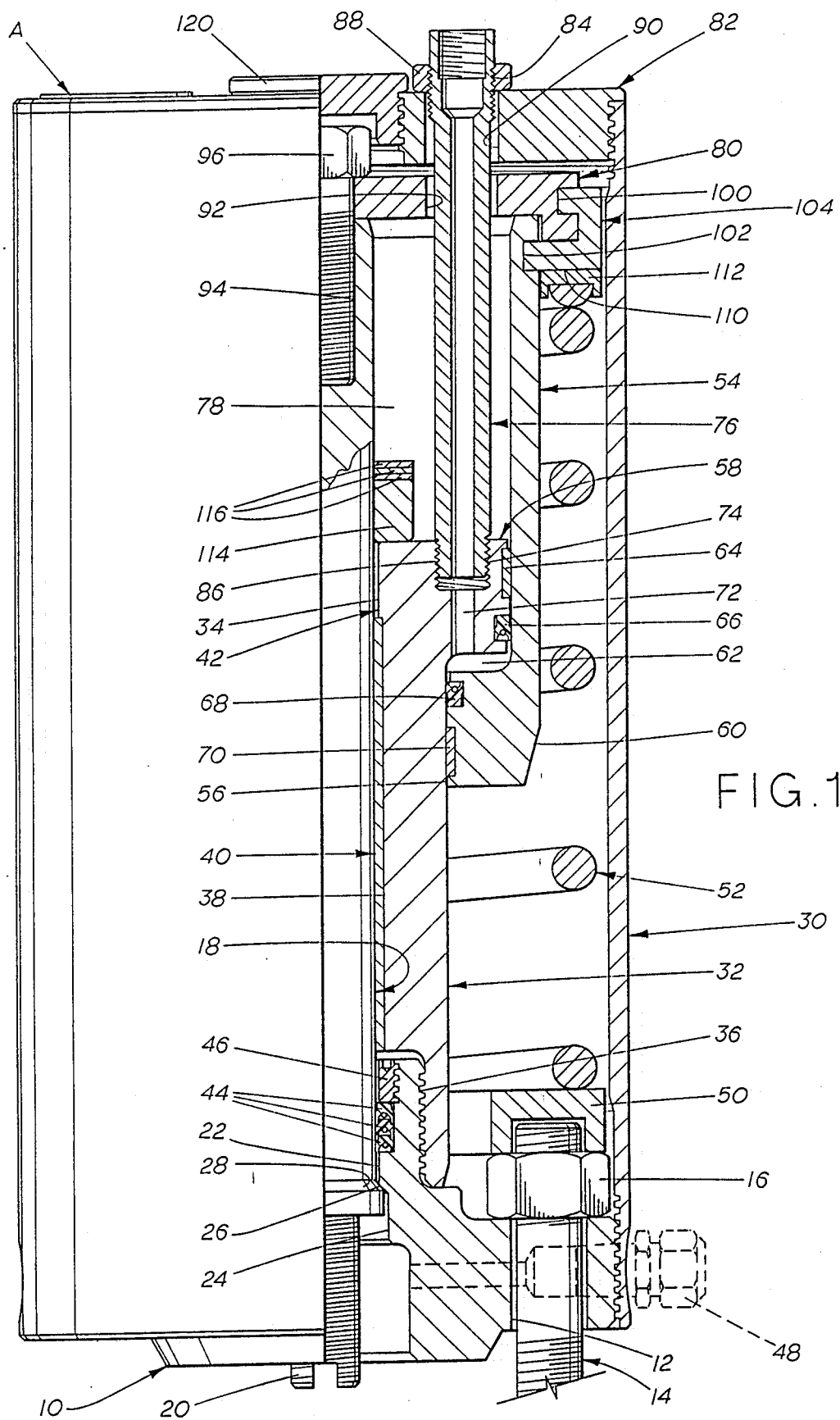
FIG. 1 is a sectional elevational view of the actuator of the present invention showing the shaft in its first position.

The apparatus A is depicted in FIG. 1. It includes a bonnet 10 having a plurality of bores 12. A stud 14 is placed through each bore 12 and threaded into a valve body (not shown) to secure the apparatus A to the valve body. A locknut 16 is threaded onto each stud 14 to accomplish this purpose.

The apparatus A has a shaft 18 which has thread 20 for engagement with the gate (not shown) on a valve body (also not shown). It should be noted that different types of connection devices could be applied to shaft 18 for connection with a valve gate without departing from the spirit of the invention. Different diameter shafts may be employed in guide means 32 as will be explained below.

Bonnet 10 has a bore 22 which accommodates shaft 18. Bore 22 tapers to bore 24 by virtue of inclined surface 26. Shaft 18 has a tapered surface 28. When tapered surface 28 contacts inclined surface 26, bonnet 10 acts as a travel stop to shaft 18, and shaft 18 is said to be in its first position. In its first position, shaft 18 is withdrawn to the greatest extent into housing 30.

Guide means 32 is an elongated member having a bore 34 through which shaft 18 passes. Guide means 32 is threadedly connected to bonnet 10 by virtue of mating threads 36. Guide means 32 has a second bore 38 which is larger than bore 34 and preferably extends for substantially the majority of the length of guide means 32. A bearing 40, preferably made of Delrin, is disposed in bore 38. Bearing 40 has a cylindrical shape. Shaft 18 passes through bearing 40 and is adapted for slidable movement with respect thereto. As shown in FIG. 1, bearing 40 extends radially inward beyond bore 34, thereby preventing contact between shaft 18 and guide means 32 at surface 42. Three ring seals 44, preferably made of lubrithane, are disposed in bonnet 10. Retainer nut 46 maintains seals 44 in contact with shaft 18. Seals 44 are preferably multiple chevron-type packing to assure pressure containment. A grease fitting 48 is provided to lubricate shaft 18 and the valve gate (not shown). Straddling all the studs 14 is ring 50, which is generally U-shaped in cross-section and covers the tops of all the studs 14. The ring 50 acts as a spring guide and is preferably made of Delrin. Spring 52 bears on ring 50 when the actuator is assembled and when it is placed in use. A piston 54 is preferably cup-shaped, having a bore 56. Guide means 32 passes through bore 56. Guide means 32 has a flange 58. As shown in FIG. 1, guide means 32 is first placed through bore 56 prior to engaging threads 36. Piston 54 has a lower end 60 which, in effect, wraps around flange 58, creating cavity 62.

Those skilled in the art will appreciate that cavity 62 has a variable volume, depending upon the position of piston 54. A pressure supply is connected to tube 76 to move shaft 18 from its first position, shown in FIG. 1, to a second position, where shaft 18 is extended and piston 54 compresses spring 52. Guide means 32 is preferably stationary. Mounted to flange 58 and in contact with piston 54 is wear ring 64, preferably made of molygard, and seal 66, preferably made of lubrithane. Mounted in lower end 60 of piston 54 are seal 68 and wear ring 70. Seals 66 and 68 seal cavity 62. An inlet passage 72 passes through flange 58 and terminates in threads 74. A tube 76 is threadedly engaged to thread 74 and extends through a cavity 78 defined by piston 54 upwardly through disk 80 and top cap 82. Tube 76 has an upper external thread 84 and a lower thread 86. Thread 86 engages thread 74. Thereafter, nut 88 is threaded to threads 84 to secure the upper end of tube 76 to top cap 82. Top cap 82 has a bore 90 to accommodate tube 76. Disk 80 has a bore 92 which is placed in alignment with bore 90 to accommodate tube 76.

Shaft 18 has a thread 94 at its upper end. Bolt 96 engages threads 94. Bolt 96 extends through disk 80 and when it is fully threaded into threads 94 brings disk 80 up against shaft 18, as shown in FIG. 1.

Referring to FIG. 2, disk 80 has a plurality of spacers 98 located adjacent its periphery and extending radially toward its center. Disk 80 further includes a peripheral groove 100. Piston 54 also includes a peripheral groove 102. Connectors 104 are generally C-shaped and have an upper extending member 106 and a lower extending member 108. Lower extending member 108 has a bearing surface 110, on which ring 112 contacts (FIG. 1). Ring 112 is essentially identical to ring 50 and is disposed at the opposite end of spring 52. Upper extending member 106 is adapted to fit inside groove 100 on disk 80. Lower extending member 108 is adapted to fit into groove 102 of piston 54.

It should be noted that as the actuator A is being assembled, spacers 98 bear on ring 112 to compress spring 52. When bolt 96 is fully threaded into threads 94, grooves 100 and 102 are moved into a relationship where connectors 104 can be hammered in, with upper extending member 106 extending into groove 100, and lower extending member 108 extending into groove 102. FIG. 2 shows four connectors 104, each covering approximately 90 degrees of disk 80. A different number of connectors 104 can be employed without departing from the spirit of the invention. In essence, the spacers 98 push down on ring 112 until disk 80 bottoms against shaft 18. At that point, spring 52 has been preloaded and connectors 104 are ready for insertion into grooves 100 and 102. The insertion of connectors 104 causes surface 110 to slightly displace ring 112. Thus, there is some interference as connectors 104 are hammered in grooves 100 and 102. This slight amount of interference, although not required, is put there to promote retention of connectors 104 to disk 80 and piston 54. In effect, spacers 98 are no longer in contact with ring 112 after connectors 104 are hammered into place as shown in FIG. 1.

A travel stop 114 is placed adjacent the top of guide means 32. Travel stop 114 is topped with a series of spacers 116. When disk 80 contacts spacers 116, the downstroke of shaft 18 is completed. Obviously, spacers and travel stops of varying dimensions can be employed, depending upon the valve to which the actuator A is connected.

The assembly of the actuator A of the present invention proceeds as follows. The bonnet 10 is connected to the valve via studs 14 and nuts 16. Shaft 18 is inserted through bonnet 10 and spring 52 is placed on top of ring 50. Thereafter, seals 44 are assembled to the bonnet 10 and affixed with retainer nut 46. The guide means 32 is threaded to bonnet 10. At this point, disk 80 is placed on top of ring 112, and spacers 98 contact ring 112. Bolt 96 is turned to engage threads 94. As bolt 96 is turned, spring 52 is downwardly compressed, thereby adding a preload. When disk 80 bottoms on shaft 18, grooves 100 and 102 are so disposed to facilitate the insertion of connectors 104. Having done this, the housing 30 is screwed onto bonnet 10 and top cap 82 is screwed onto housing 30. Thereafter, tube 76 is inserted through top cap 82 and bore 92 and disk 80 and threaded to flange 58. The top of tube 76 is secured to top cap 82 by nut 88. A separately removable cap 120 can be made a part of top cap 82. This allows access to bolt 96.

Depending upon the application, travel stop 114 and spacers 116 can be installed to be of varying dimensions as needed. Bearings 40 can be changed out of guide means 32 to accommodate shafts of varying diameters, depending upon the application. This interchangeability of shafts provision makes the apparatus A of the present invention much more adaptable to a variety of uses and valve applications. The apparatus A is also more economical to manufacture and assemble and has eliminated many parts used in previous designs in a compact package, capable of operating in low clearance situations. The need for special tools to deal with preloading the spring and retaining the spring for disassembly are eliminated.

The foregoing disclosure and description of the invention are illustrative and explanatory thereof, and various changes in the size, shape and materials, as well as in the details of the illustrated construction, may be made without departing from the spirit of the invention.

What is claimed is:

1. A valve actuator comprising:
   a base adapted to be mounted to a valve body;
   a shaft mounted to said base for reciprocation between a first and second position;
   biasing means for biasing said shaft into said first position;
   piston means surrounding said shaft for selectively overcoming said biasing means for urging said shaft toward said second position;
   a removable connection means connecting said shaft directly to the outer periphery of said piston means for easy assembly and disassembly;
   said biasing means being disposed externally of said piston and bearing directly on said connection means at a point adjacent the outer periphery of said piston means.

2. The apparatus of claim 1, wherein said connection means further comprises:
   a disk adapted to be mounted to said shaft;
   receiving means on said disk;
   said piston formed having accepting means thereon; and
   at least one connecting member extending into both said receiving and accepting means to connect said disk to said piston.

3. The apparatus of claim 2, wherein said disk further comprises at least one spacer extending therefrom in a direction substantially parallel to said shaft, said spacer bearing on said biasing means as said disk is mounted to said shaft.

4. The apparatus of claim 3 wherein:
said biasing means further comprises at least one spring;
fastening means for selectively drawing said disk into contact with said shaft;
said spring receiving a preload as said fastening means brings said disk in contact with said shaft.

5. The apparatus of claim 4, wherein:
said connecting member is formed having an upper and lower parallel extending members, said lower extending member adapted to engage said accepting means on said piston, said upper extending member adapted to engage said receiving means;
whereupon engagement of said disk to said shaft as a result of selective operation of said fastening means, said spring is preloaded by said spacer, and said accepting and receiving means are positioned to facilitate entry therein of said lower and upper extending members, respectively.

6. The apparatus of claim 5, wherein:
said piston has a smaller diameter than said disk;
said biasing means includes a bearing ring in contact with said spring;
said lower extending member having a bearing surface extending radially beyond said piston;
said bearing ring disposed between said spring and said bearing surface.

7. The apparatus of claim 6, wherein:
said bearing surface of said lower extending member extends in a direction substantially parallel to said shaft and beyond said spacer when said connecting member is fitted to said disk;
whereupon insertion of said connecting member, said bearing ring contacts said bearing surface and said spacer is moved out of contact with said bearing ring.

8. The apparatus of claim 7, further comprising:
guide means having a bore connected to said base for guiding said shaft as it moves in said bore between said first and second positions;
said piston means movably mounted to said guide means, said piston and guide means formed defining a cavity therebetween whose volume varies as said shaft moves between said first and second positions;
sealing means between said piston means and said guide means for sealing said cavity.

9. The apparatus of claim 8, wherein:
said guide means is formed having a passageway providing flow communication into said cavity; and
a tube extending from said passageway through said disk.

10. The apparatus of claim 9, further comprising:
a housing mounted to said base at a first end;
a top cap mounted to a second end of said housing;
said housing and top cap enclosing said piston and biasing means after assembly of said connection means;
said top cap formed having a bore therethrough;
said tube received in said bore in said top cap for connection to said guide means after assembly of said top cap to said housing.

11. The apparatus of claim 10, wherein said guide means further comprises:
replaceable liner means mounted in said bore to guide said shaft to allow the same guide means to accommodate a variety of shaft diameters by use of liner means having a different bore size.

12. The apparatus of claim 11, wherein:
said base has a plurality of bores;
a plurality of studs extending through said bores in said base;
a locknut on each stud for attaching said base to a valve body before said housing is mounted to said base;
a second bearing ring in contact with said spring and said studs and disposed therebetween.

13. A valve actuator comprising:
a housing further comprising a base for mounting to a valve body;
a shaft extending through said base and adapted to reciprocate with respect to said housing from a first to a second position;
guide means in said housing for guiding said shaft as it moves therethrough;
piston means surrounding said shaft movably mounted with respect to said guide means and defining a variable-volume cavity therebetween;
a removable connection means connecting said shaft directly to the outer periphery of said piston means for easy assembly and disassembly;
biasing means being disposed externally of said piston and bearing directly on said connection means at a point adjacent the outer periphery of said piston.

14. A valve actuator comprising:
a base adapted to be mounted to a valve body;
a shaft mounted to said base for reciprocation between a first and second position;
biasing means on said base for biasing said shaft into said first position;
piston means on said base for selectively overcoming said biasing means for urging said shaft toward said second position;
a removable connection means connecting said shaft directly to the outer periphery of said piston means for easy assembly and disassembly;
said biasing means being disposed externally of said piston and bearing directly on said connection means at a point adjacent the outer periphery of said piston means;
guide means having a bore connected to said base for guiding said shaft as it moves in said bore between said first and second positions;
said guide means further comprising:
replaceable liner means mounted in said bore to guide said shaft to allow the same guide means to accommodate a variety of shaft diameters by use of liner means having a different bore size.

15. A valve actuator comprising:
a base adapted to be mounted to a valve body;
a shaft mounted to said base for reciprocation between a first and second position;
biasing means for biasing said shaft into said first position;
piston means for selectively overcoming said biasing means for urging said shaft toward said second position;
connection means for connecting said shaft to said piston means;
said biasing means bearing on said connection means;
said connection means further comprising:
a disk adapted to be mounted to said shaft;

receiving means on said disk;

said piston having accepting means thereon; and at least one connecting member extending into both said receiving and accepting means to connect said disk to said piston.

16. The apparatus of claim 15, further comprising:

guide means having a bore connected to said base for guiding said shaft as it moves in said bore between said first and second positions;

said piston means movably mounted to said guide means, said piston and guide means formed defining a cavity therebetween whose volume varies as said shaft moves between said first and second positions;

sealing means between said piston means and said guide means for sealing said cavity.

17. The apparatus of claim 16, wherein:

said guide means is formed having a passageway providing flow communication into said cavity; and a tube extending from said passageway through said disk.

18. The apparatus of claim 17, further comprising:

a housing mounted to said base at a first end;

a top cap mounted to a second end of said housing;

said housing and top cap enclosing said piston and biasing means after assembly of said connection means;

said top cap formed having a bore therethrough;

said tube received in said bore in said top cap for connection to said guide means after assembly of said top cap to said housing.

19. The apparatus of claim 18, wherein said guide means further comprises:

replaceable liner means mounted in said bore to guide said shaft to allow the same guide means to accommodate a variety of shaft diameters by use of liner means having a different bore size.

20. The apparatus of claim 19, wherein:

said base has a plurality of bores;

a plurality of studs extending through said bores in said base;

a locknut on each stud for attaching said base to a valve body before said housing is mounted to said base;

a second bearing ring in contact with said spring and said studs and disposed therebetween.

21. The apparatus of claim 15, further comprising:

guide means having a bore connected to said base for guiding said shaft as it moves in said bore between said first and second positions, said guide means further comprising:

replaceable liner means mounted in said bore to guide said shaft to allow the same guide means to accommodate a variety of shaft diameters by use of liner means having a different bore size.

22. A valve actuator comprising:

a housing further comprising a base for mounting to a valve body;

a shaft extending through said base and adapted to reciprocate with respect to said housing from a first to a second position;

guide means in said housing for guiding said shaft as it move therethrough;

piston means movably mounted with respect to said guide means and defining a variable-volume cavity therebetween;

means for connection of said shaft to said piston means;

biasing means bearing on said connection means for retaining said shaft in said first position;

a tube extending through said housing into said guide means, said tube passing within but not in contact with said piston;

said connection means further comprising:

a disk adapted to be mounted to said shaft;

receiving means on the outer periphery of said disk;

said piston having accepting means on its outer periphery; and at least one connecting member removably extending into both said receiving and accepting menas to connect said disk to said piston.

23. The apparatus of claim 22, wherein said guide means further comprises:

replaceable liner means mounted in said bore to guide said shaft to allow the same guide means to accommodate a variety of shaft diameters by use of liner means having a different bore size.

24. The apparatus of claim 22, wherein said disk further comprises:

at least one spacer extending therefrom in a direction parallel to said shaft, said spacer bearing on said biasing means as said disk is mounted to said shaft.

25. The apparatus of claim 24, wherein:

said biasing means further comprises at least one spring;

fastening means for selectively drawing said disk into contact with said shaft;

said spring receiving a preload as said fastening means brings said disk in contact with said shaft.

26. The apparatus of claim 25, wherein:

said connecting member is formed having an upper and lower parallel extending members, said lower extending member adapted to engage said accepting means on said piston, said upper extending member adapted to engage said receiving means;

whereupon engagement of said disk to said shaft as a result of selective operation of said fastening means, said spring is preloaded by said spacer, and said accepting and receiving means are positioned to facilitate entry therein of said lower and upper extending members, respectively.

27. The apparatus of claim 26, wherein:

said piston has a smaller diameter than said disk;

said biasing means includes a bearing ring in contact with said spring;

said lower extending member having a bearing surface extending radially beyond said piston;

said bearing ring disposed between said spring and said bearing surface.

28. The apparatus of claim 25, wherein:

said bearing surface of said lower extending member extends in a direction parallel to said shaft and beyond said spacer when said connecting member is fitted to said disk;

whereupon insertion of said connecting member, said bearing ring contacts said bearing surface and said spacer is moved out of contact with said bearing ring.

* * * * *